US009797733B2

United States Patent
Strassenburg-Kleciak

(10) Patent No.: US 9,797,733 B2
(45) Date of Patent: Oct. 24, 2017

(54) NAVIGATION SYSTEM AND METHOD OF DETERMINING A VEHICLE POSITION

(71) Applicant: HARMAN BECKER AUTOMOTIVE SYSTEMS GMBH, Karlsbad (DE)

(72) Inventor: Marek Strassenburg-Kleciak, Garching Bei Munchen (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 14/650,562

(22) PCT Filed: Apr. 10, 2013

(86) PCT No.: PCT/EP2013/057490
§ 371 (c)(1),
(2) Date: Jun. 8, 2015

(87) PCT Pub. No.: WO2014/166532
PCT Pub. Date: Oct. 16, 2014

(65) Prior Publication Data
US 2016/0097644 A1  Apr. 7, 2016

(51) Int. Cl.
G01C 21/26  (2006.01)
G01C 21/30  (2006.01)
(Continued)

(52) U.S. Cl.
CPC ............ *G01C 21/26* (2013.01); *G01C 21/30* (2013.01); *G01C 21/3602* (2013.01);
(Continued)

(58) Field of Classification Search
CPC ... H04Q 2209/25; H04W 4/025; G01C 21/20; G01C 21/30; G01C 21/3647;
(Continued)

(56) References Cited

U.S. PATENT DOCUMENTS

2007/0021912 A1  1/2007 Morita et al.
2008/0226130 A1  9/2008 Kansal et al.
(Continued)

FOREIGN PATENT DOCUMENTS

CN  1880916 A  12/2006
EP  1 674 827 A  12/2006
(Continued)

OTHER PUBLICATIONS

PCT Search Report for Application No. PCT/EP2013/057490 dated Dec. 20, 2013.

*Primary Examiner* — Jason Holloway
(74) *Attorney, Agent, or Firm* — Artegis Law Group, LLP

(57) ABSTRACT

Navigation system and method of determining a vehicle position A navigation system comprises an image sensor configured to capture image data. A map database comprises street lighting data which includes, for a plurality of street lights (41), position data indicating a position (31) at which a street light (41) is installed and height data indicating a height (34) at which a light source (42) of the street light (41) is located. A processing device is configured to refine a position estimate by analyzing the image data using the street lighting data.

14 Claims, 7 Drawing Sheets

(51) Int. Cl.
*G01C 21/36* (2006.01)
*G06K 9/00* (2006.01)
*G06T 7/70* (2017.01)

(52) U.S. Cl.
CPC ..... *G01C 21/3658* (2013.01); *G06K 9/00798* (2013.01); *G06T 7/70* (2017.01); *G06T 2207/10004* (2013.01)

(58) Field of Classification Search
CPC ...... G01C 11/02; G01C 11/025; G01C 21/00; G01C 21/26; G01C 21/3658; G01C 21/3602; G06K 9/00832; G06K 9/00818; G06K 9/00825; G06K 9/00798; G06K 9/00791; G06T 2207/10004
See application file for complete search history.

(56) References Cited

U.S. PATENT DOCUMENTS

| | | | | |
|---|---|---|---|---|
| 2008/0292320 A1* | 11/2008 | Pederson | ........... | H04B 10/1143 398/128 |
| 2008/0319648 A1* | 12/2008 | Poltorak | ............... | G08G 1/0969 701/423 |
| 2009/0140887 A1* | 6/2009 | Breed | ................... | G01C 21/165 340/990 |
| 2009/0315466 A1* | 12/2009 | Ko | ..................... | H05B 37/0218 315/149 |
| 2010/0235096 A1* | 9/2010 | Miyagi | ................. | G01C 21/30 701/412 |
| 2014/0037297 A1* | 2/2014 | Pederson | ........... | H04B 10/1143 398/128 |
| 2015/0173159 A1* | 6/2015 | Lin | ......................... | G01W 1/00 315/120 |

FOREIGN PATENT DOCUMENTS

| | | |
|---|---|---|
| JP | 2006215982 A | 8/2006 |
| JP | 2010002225 A | 1/2010 |

* cited by examiner

NAVIGATION SYSTEM AND METHOD OF DETERMINING A VEHICLE POSITION

CROSS-REFERENCE TO RELATED APPLICATIONS

The present application is a national stage application of PCT/EP2013/057490 titled, "NAVIGATION SYSTEM AND METHOD OF DETERMINING A VEHICLE POSITION," and filed on Apr. 20, 2013. The subject matter of this related application is hereby incorporated herein by reference.

TECHNICAL FIELD

Embodiments of the invention relate to a navigation system comprising an image sensor and a map database and to methods performed by such a navigation system. Embodiments of the invention relate in particular to navigation systems and methods in which information stored in the map database may be used to determine a position more accurately.

BACKGROUND

Navigation systems are widely used in cars and other vehicles. The increasing popularity of navigation systems can be attributed to the enhanced comfort and increased security offered by such systems. Navigation systems may provide assistance in navigation tasks such as identifying an optimum route, identifying suitable route alternatives, or route guidance. Route guidance is one example of a driver assistance function. A driver may be informed when a lane change is required to follow a certain route. Other driver assistance functions may relate to security-related aspects, such as warning a driver when he is positioned on the wrong lane, warning the driver of a potentially dangerous intersection or other critical situations.

Driver assistance systems which help the driver in the driving process are also referred to as "Advanced Driver Assistance Systems" (ADAS). Examples for such advanced driver assistance functions include lane departure warnings, lane change assistance, or night vision, for example. Some advanced driver assistance function require the position of the vehicle to be determined with an accuracy which is less than a lane width in the transverse direction of a road, for example, to identify the lane on which a vehicle is presently located.

One approach for improving the position determining accuracy combines different position sensing techniques. For illustration, a combination of GPS and wheel speed sensor may be used to determine the position along a longitudinal direction of a road with higher accuracy.

Other approaches for improving the position determining accuracy may use a combination of data stored in a map database and image data captured with an image sensor. Approaches of this type may be used to identify lane markings, traffic signs, or other buildings in an image and to perform a matching between objects identified in an image and map data to refine a position estimate provided, for example, by a GPS system or other positioning system. Such conventional systems may suffer from reduced performance under poor lighting conditions, in particular during night time. The driver is in particular need for reliable driver assistance functions at night time when visual conditions are poor.

SUMMARY

There is a continued need for navigation systems and methods which allow a position to be determined more reliably even at night time. There is a need for such a navigation system and method which provides good performance even at night time.

In navigation systems and methods according to embodiments, a map database stores street lighting data. The street lighting data includes information on street lights. An image sensor captures image data. The light emitted by street lights can be reliably identified in the image data at night time when there is no sunlight. By matching the positions of light sources in the image data to the positions stored in the map database, the position estimate may be refined.

As used herein, "refining a position estimate relates" is understood to mean an improvement of a position estimate such that the refined position estimate more accurately corresponds to a real position than the original position estimate on which the refining is performed. The position estimate which is subsequently refined may be determined using a position sensor.

In some embodiments, a position estimate may in particular be refined using the street lighting data to detect a lane on which a vehicle in which the image sensor is installed is positioned, or to otherwise improve the position estimate in a transverse direction of a road. Refining the position estimate may consist in or may comprise determining a lane.

In some embodiments, an advance driver assistance function may be controlled in dependence on a refined position estimate that is determined based on the image data and street lighting data.

According to an embodiment, a navigation system is provided. The navigation system comprises an image sensor configured to capture image data. The navigation system comprises a map database comprising street lighting data which includes, for a plurality of street lights, position data indicating a position at which a street light is installed and height data indicating a height at which a light source of the street light is located. The navigation system comprises a processing device coupled to the map database and the image sensor. The processing device is configured to refine a position estimate by analyzing the image data using the street lighting data.

According to another embodiment, a method of determining a vehicle position is provided. The method comprises capturing image data using an image sensor installed in a vehicle. The method comprises retrieving street lighting data from a map database. The street lighting data includes, for a plurality of street lights, position data indicating a position at which a street light is installed and height data indicating a height at which a light source of the street light is located. The method comprises refining a position estimate. Refining the position estimate comprises analyzing the image data using the street lighting data.

Embodiments of the utilize information on street lighting, in particular on street light positions and the heights of the light sources, to determine a position with greater accuracy. The navigation system and method provides a particularly reliable performance when ambient light is low, e.g. at night time.

It is to be understood that the features mentioned above and those to be explained below can be used not only in the respective combinations indicated, but also in other combinations or in isolation. Other systems, methods, features and advantages of the invention will be or will become apparent to one with skill in the art upon examination of the following figures and detailed description.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION

Figure 1:
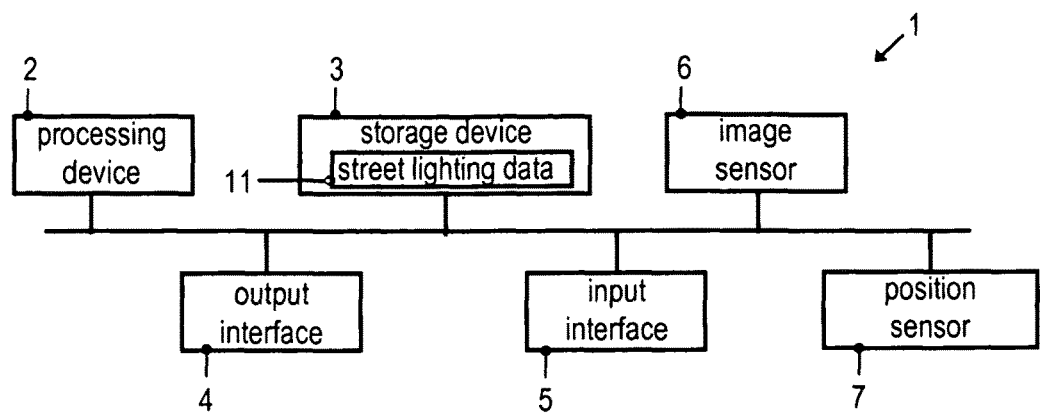
FIG. 1 is a schematic block diagram of a navigation system according to an embodiment.

FIG. 1 schematically illustrates a navigation system 1 according to an embodiment. The navigation system 1 may be installed in a vehicle. The navigation system 1 comprises a processing device 2 which controls operation of the navigation system 1. The processing device 2 may comprise a central processing unit, for example in form of one or more microprocessors, digital signal processors or application-specific integrated circuits. The processing device, 2 may comprise a graphics processor for processing image data. The navigation system 1 further includes a map database stored in a storage device 3. The storage device 3 may comprise any one, or any combination, of various types of memory, such as random access memory, flash memory or a hard drive, but also removable memories such as a compact disk (CD), a DVD, a memory card or the like. The storage device 3 may be a non-volatile storage medium in which the map database is stored. The navigation system 1 comprises an image sensor 6. The image sensor 6 may comprise a camera which captures image frames, a stereo camera, a semi-conductor based sensor array, e.g. a CCD or CMOS image sensor, or other image sensor components. The image sensor 6 may be sensitive to light having a wavelength in the visible spectral range. The image sensor 6 is operative to capture image data and provides the image data to the processing device 2. The image sensor 6 may be installed in the vehicle at a known position and with a known orientation.

The navigation system 1 may include a position sensor 7 for determining a position estimate for the vehicle in which the navigation system 1 is installed. The position sensor 7 may be operative to generate data which indicates a position estimate or from which a position estimate may be derived. The position sensor may comprise a GPS (Global Positioning System) sensor, a Galileo sensor, a position sensor based on mobile telecommunication networks, and/or vehicle-based components. For illustration, the position sensor may comprise a wheel speed sensor, optionally in combination with a GPS or Galileo sensor.

The navigation system 1 may include an output interface 4 for outputting information to a user. The output interface 4 may comprise an optical output device which may comprise a screen and/or a projector. The navigation system 1 may include an input interface 5. The navigation system 1 may include additional components, such as a wireless receiver and/or a vehicle interface. The wireless receiver may be configured to receive information for updating the map database stored in the storage device 3. The wireless receiver may be configured to receive street lighting data over a wireless interface. The street lighting data may be buffered or stored at the navigation system 1. The vehicle interface may allow the processing device 2 to obtain information from other vehicle systems, e.g. vehicle status information. The vehicle interface may for example comprise a CAN (controller area network) or MOST (Media Oriented devices Transport) interface.

The storage device 3 stores a map database. As will be explained in more detail in the following, the map database stores street lighting data 11 which indicates positions at which street lights are installed. The street lighting data 11 also includes height data indicating a height at which a light source of the respective street light is installed. The street lighting data may include data indicating a pattern in which light is emitted by a street light for at least some of the street lights. The street lighting data is respectively configured such that it indicates a position of a light source of a street light in space, including information on a height at which the light source is located above ground.

As will be explained in more detail below, the processing device 2 is configured to match the light pattern generated by street lights and shown in the image data to the street lighting data stored in the map database. The processing device 2 may refine a position estimate provided by the position sensor 7 by this matching procedure.

The processing device 2 may be configured to determine a lane on which a vehicle is located by matching the light emitted by street lights shown in the image data to the street lighting data.

The processing device 2 may be configured to determine a distance of a vehicle from a lane boundary by matching the light emitted by street lights shown in the image data to the street lighting data.

Figure 2:
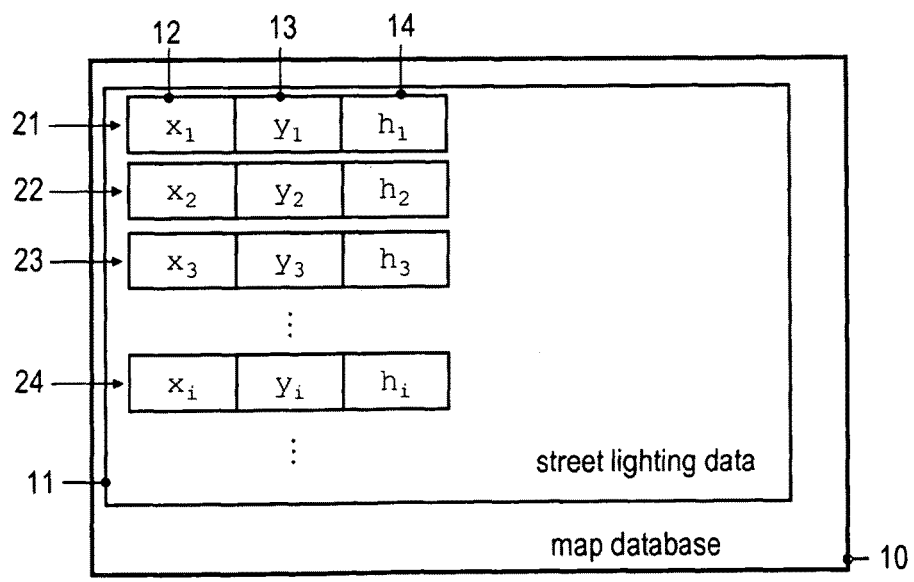
FIG. 2 is a schematic representation of a map database of a navigation system according to an embodiment.

FIG. 2 is a schematic representation of a map database 10 which may be used in the navigation system 1. The map database 10 having the structure explained in the following may be stored in a non-volatile storage device of the navigation system 1.

The map database 10 includes street lighting data 11. The street lighting data may include data which specify positions at which street lights are mounted. The street lighting data may include data which specifies a height of a light source of the respective street light. Various formats may be used to store the street lighting information. For illustration, the street lighting data 11 may comprise a table. The table may be a table of a relational database.

The street lighting data 11 may comprise data 21 associated with a first street light. The data 21 for the first street light may include coordinates 12, 13 at which the base of the street light is positioned. The data 21 may include a height value 14 indicating a height at which a center of a light source of the street light is positioned above ground. The data 22, 23, 24 representing other street lights may be configured in the same or a similar way as explained for the data 21 associated with the first street light.

Generally, the data stored in the street lighting data for a street light includes position data indicating where the street light is installed. The position data may be composed of a pair of coordinates, as illustrated in FIG. 2. The position data may define the longitude and latitude of the point at which the respective street light is installed.

The data stored in the street lighting data for a street light also includes height data which indicates a height of a light source. The height data may include a height value indicating a height above street level, for example. The height data may include other information which allows the processing device 2 to determine the height at which the light source is located.

Other information may be included in the street lighting data 11. For illustration, information indicating an emission pattern at which light is emitted by the respective street light may be stored in the street lighting data 11. The information may indicate one of a discrete set of emission types. The emission types may include spherical light emission, light emission in a downward direction, light emission in an upward direction, or light emission in a lateral direction. The information on the emission pattern may be used to discriminate street lights from each other when matching light patterns in the captured image data and the street lighting data. The information on the emission pattern may increase the object recognition speed with which street lights are identified in the image. Image recognition procedures may be selected in dependence on the emission patterns which are expected to be found in the image data. The information on the emission pattern may also increase recognition quality, because street lights can be discriminated from other light sources, such as lighted windows or light-emitting advertisements, in a particularly reliably manner.

Information indicating a color with which light is emitted by the light source of the respective street light may be stored in the street lighting data 11. The information may indicate one of a discrete set of color values. The information on the emission color may be used to discriminate street lights from each other when matching captured image data and the street lighting data. The information on the color may increase the objection recognition speed with which street lights are identified in the image. Image recognition procedures may be selected in dependence on light emission colors which are expected to be found in the image data.

Other data may be included in the map database. The map database may include a plurality of layers. The layers may include a routing layer which stores the information required for performing route searches and a guidance layer which stores data required for route guidance. The map database may include additional layers. A name layer may include references to road names, house numbers or similar. A point of interest (POI) layer may include information on points of interest. An Advanced Driver Assistance System (ADAS) layer may include data for Advanced Driver Assistance. Additional or alternative layers may be included in the map database, such as a truck layer including specific information for trucks or lorries, a layer for phonetic representations, or a layer for basic map display. The street lighting data may be stored in any one of these layers or in a dedicated layer. For illustration, the street lighting data may be included in the ADAS layer or the guidance layer.

The map database 10 may be configured as a relational database. At least one of the layers of the database, e.g. the ADAS layer or the guidance layer, may include the street lighting data.

Figure 3:
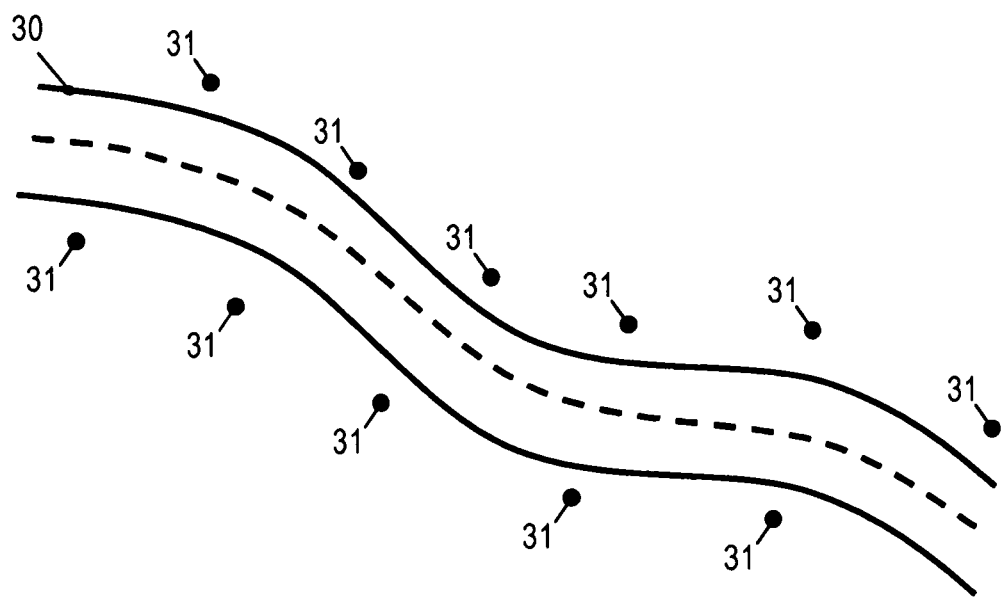
FIG. 3 is a plan view illustrating positions of street lights.

FIG. 3 is a plan view illustrating a map portion. The map portion includes a road 30. Street lights are positioned along the road 30. The positions at which the street lights are mounted may be defined by coordinates of base positions 31 at which the street light is attached to the ground. In other implementations, the positions at which the street lights are mounted may be defined by coordinates of a projection of the light source of the respective street light onto the ground plane. The position data may respectively include a pair of coordinates defining the position in a world reference frames. The coordinates may also take other formats. For illustration, the position data may define a position of a street light in terms of a position measured along the road 30 plus an offset in the direction transverse to the road 30.

Figure 4:
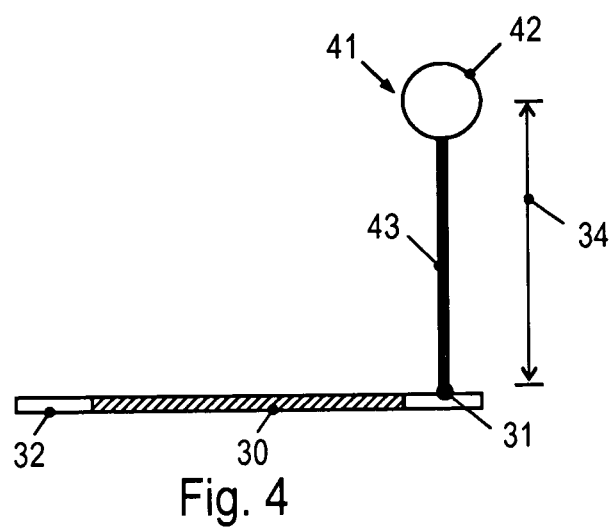
FIG. 4 is a cross-sectional view illustrating a height of a light source of a street light.

FIG. 4 is a cross-sectional view of a terrain through a base of a street light 41. The base of the street light 41 is anchored at a base position 31 in a terrain 32 adjacent to road 30. The mount structure which supports a light source 42 of the street light 41 may be a post 43. Other mount structures may be used. For illustration, the light source may be mounted above ground using a cable which extends above the street. The light source 42 is located at a height 34 above street level. Height data indicating the height 34 may be stored in the street lighting database. The height 34 may be defined as a height of a center of the light source 42 above ground, as a height of a lowest point of the light source 42 above ground, as a height of a topmost point of the light source 42 above ground, or in another suitable way.

Depending on the construction of the street light, additional parameters associated with the street light may be stored in the street lighting data.

Figure 5:
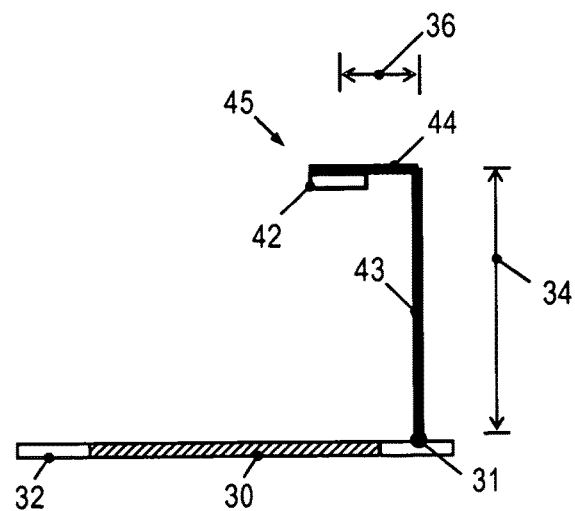
FIG. 5 is a cross-sectional view illustrating a height of a light source of another street light.

FIG. 5 is a cross-sectional view of a terrain through a base of another street light 45. The base of the street light 45 is anchored at a base position 31 in a terrain 32 adjacent to road 30. The mount structure which supports a light source 42 of the street light 45 has a generally vertical post 43 and an arm 44 extending therefrom. The light source 45 is installed at the arm 44 such that it is offset from the base position 31 in a direction parallel to the street plane. The offset 36 may be stored in the street lighting data. The offset 36 may be defined as an offset, measured parallel to the road plane, between the base position 31 and a center of the light source 42, as an offset between the base position 31 and a point of the light source 42 which is closest to the post 43, as an offset between the base position 31 and a point of the light source 42 which is most remote from the post 43, or in another suitable way.

In other implementations, it is not required that the offset 36 is stored in the street lighting data. For illustration, the projection point of the light source 42 onto the road plane may be stored as position data indicating the position where the street light is installed. It is then not required, albeit still possible, that the offset 36 is stored in the street lighting data.

Figure 6:
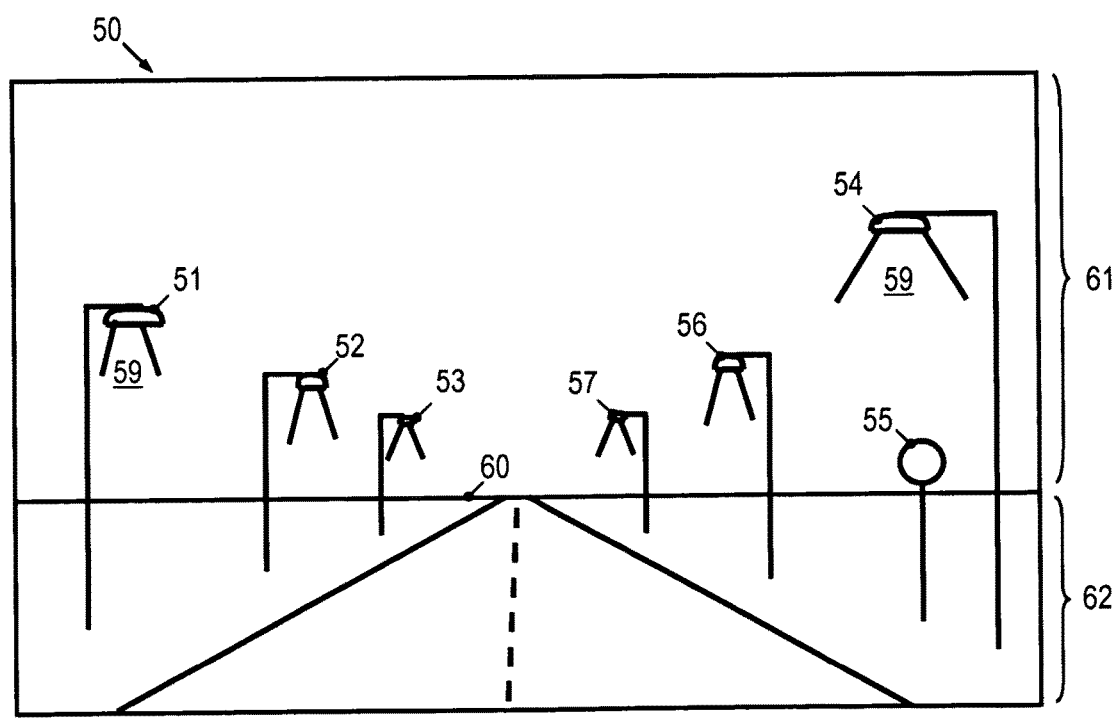
FIG. 6 is an illustrative view of image data for explaining the operation of a navigation system according to an embodiment.

FIG. 6 is an illustrative view of image data 50. In use of the navigation system 1, the image data are captured 50 using the image sensor 6. For vehicles equipped with several image sensors, each one of the image sensors may respectively captured a two-dimensional or three-dimensional image. The procedures described in the following may then be performed for at least one of the images.

A plurality of street lights 51-57 is located in a field of view (FOV) of the image sensor 6. In certain conditions, at least some of the street lights 51-57 are operated to emit light. These conditions may depend on time of day and/or weather conditions. The street lights 51-57 may be operated at night time. The street lights 51-57 may be operated when vision conditions are poor, for example when there is snowfall or fog.

Generally, the processing device 2 of the navigation system 1 processes the image data 2 to improve a position determining accuracy. When ambient light conditions are poor, e.g. during night time or in other conditions when the street lights 51-57 are turned on, a matching is performed between the street lights 51-57 shown in the image data 50 and the street lighting data 11 stored in the map database.

When ambient light conditions are poor and the street lights 51-57 are turned on, the light emitted by the street lights 51-57 can be reliably detected in the image data. A position determination which takes advantage of the light emitted by the street lights 51-57 as seen in the image data 50 and the street lighting data of the map database provides reliable improvement of position estimates at night time, for example.

The analysis of the image data 50 which is performed to improve the position estimate using the street lighting data may be restricted to a portion of the image data. For illustration, the analysis of the image data 50 to identify street lights may be restricted to a portion 61 located above a horizon line 60.

Another portion 62 of the image data located below the horizon line 60 may be disregarded when matching a light pattern expected based on the street lighting data to the image data 50.

The horizon line 60 may be detected by object recognition in the image data 50. The horizon line 60 may be determined from the location and attitude at which the image sensor 6 is installed on a vehicle. A road slope retrieved from the map database may optionally be taken into account when determining the location of the horizon line 60.

When matching light emitted by street lights 51-57 as shown in the image data 50 and the light pattern expected from the street lighting data 11, the portion 62 of the image data 50 located below the horizon line may be discarded. Reflections of light on the road surface or other lights located close to ground level are less likely to influence the matching procedure between image data and street lighting data when the other portion 62 is excluded from the matching process.

Generally, the processing device 2 performs a matching between the light 59 in the image data 50 detected by the image sensor 6 and a light pattern which would be expected for a given vehicle position based on the street lighting data. By determining the expected light pattern computed for at least two vehicle positions to the detected light pattern in the image portion 61 above the horizon line 60, the vehicle position may be identified for which the expected light pattern better reproduces the light pattern detected with the image sensor 6.

The location and attitude at which the image sensor 6 is installed on the vehicle may be taken into account when computing the expected light pattern.

The processing device 2 may retrieve a position estimate from the data captured by the position sensor 7. Based on this position estimate, the processing device 2 may identify those street lights, using the street lighting data, which are expected to be located in the field of view of the image sensor 2. The processing device 2 then performs a matching between the light pattern expected based on the street lighting data and the image data 50, as explained above. In this manner, the processing device 2 may determine on which one of several road lanes the vehicle is located, for example.

Figure 7:
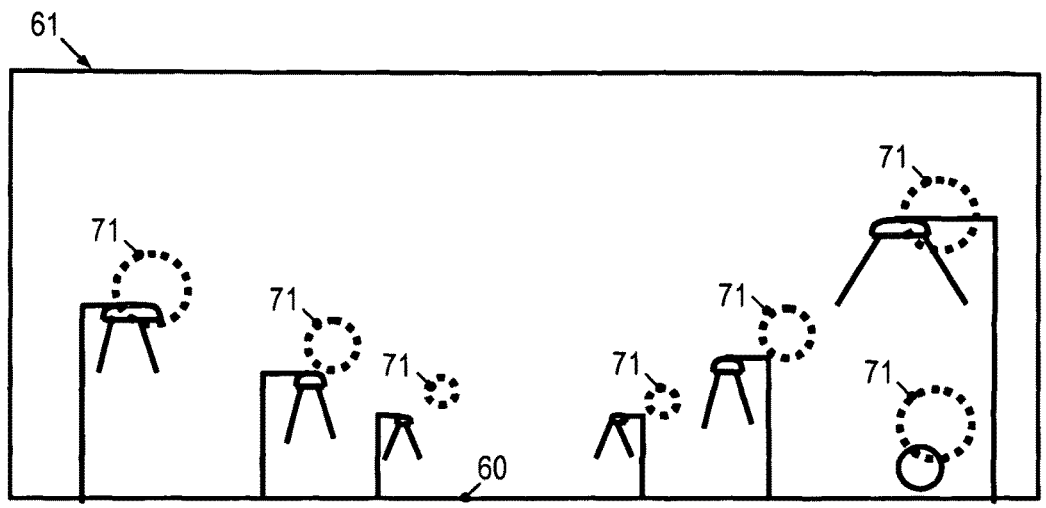
FIG. 7 and FIG. 8 show light source locations predicted based on street lighting data of a navigation system according to an embodiment.
Figure 8:
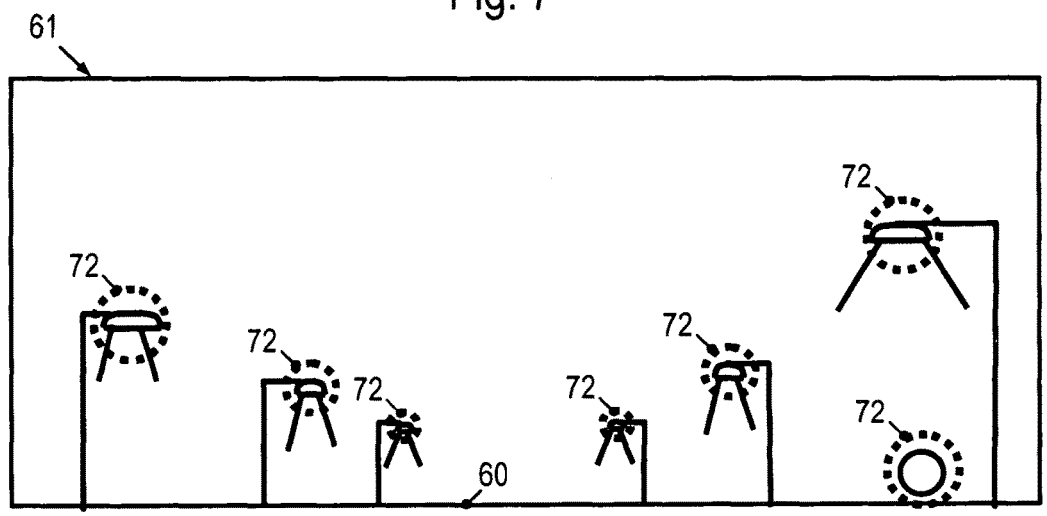
Figure 9:
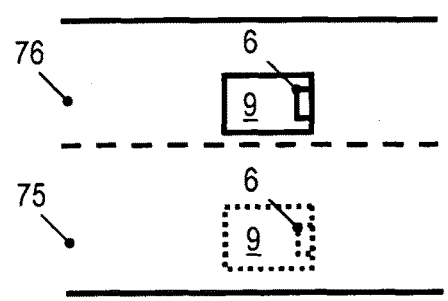
FIG. 9 is a plan view of a road illustrating a refinement of a position estimate by a navigation system according to an embodiment.

Referring to FIG. 7 to FIG. 9, the matching between image data and expected light emission from street lights will be explained in more detail.

FIG. 7 shows the portion 61 of the image data. For a hypothetical vehicle position, the processing device 2 determines image regions 71 in which the light sources of the street lights are expected. The image regions 71 are determined using the position data and height data of the street lights stored in the street lighting data.

Various techniques for computing the expected locations of an object in image data are known which can be performed with little computational complexity. For illustration, relative positions and between each one of the light sources expected to be in the FOV of the image sensor and the image sensor may be computed. A projection matrix may be applied to compute the position in the image data from the relative position. The projection matrix may take into account optical characteristics of an optics of the image sensor 6. Other techniques may be used to compute image regions 71, e.g. ray tracing techniques etc.

For the hypothetical vehicle position for which the image regions 71 are computed, there is an offset between the expected locations at image regions 71 and the real positions in the portion 61 of the image data 50.

FIG. 8 shows the portion 61 of the image data located above the horizon line. For another hypothetical vehicle position, the processing device 2 determines image regions 72 in which the light sources of the street lights are expected. This determining may be performed as explained for FIG. 7 above.

For the hypothetical vehicle position for which the image regions 72 are computed, there is a good match between the expected locations at image regions 72 and the real positions in the portion 61 of the image data 50.

The different vehicle positions for which the image regions 71 and image regions 72 are computed may correspond to different positions of the vehicle in the transverse direction of a road. For illustration, the expected light source locations may be computed for different lanes on which the vehicle could be positioned. Additionally, the expected light source locations may be computed for plural possible vehicle locations which are offset from each other along the transverse direction and/or the longitudinal direction of the road. The position estimate determined using the position sensor 7 may provide a starting point for the matching procedure. The vehicle may be virtually shifted along the transverse direction and/or the longitudinal direction of the road by respectively computing the expected light pattern and comparing it to the light pattern in the image data 50 detected by the image sensor 6. Changes in vehicle position may also correspond to different locations of the vehicle on the road.

The expected locations of the light sources of the street lights may respectively be determined from the position data and the height data stored in the street lighting data of the map database. This information allows relative positions between the image sensor 6 and the various street lights positioned in the FOV to be determined for each hypothetical vehicle position.

FIG. 9 illustrates how a position estimate may be refined by using the street lighting data. A first pattern of regions where high light emission is expected may be computed assuming a first hypothetical position of a vehicle 9 on a road. The first hypothetical position may correspond to a position on a first lane 75. A second pattern of regions where high light emission is expected may be computed assuming a second hypothetical position of the vehicle 9 on the road. The second hypothetical position may correspond to a position on a second lane 76.

The first pattern and the second pattern may respectively include expected locations of light sources. The expected locations of light sources are the locations for which brighter image areas may be expected. For illustration, the first pattern may correspond to the pattern of light source locations shown by image regions 71 in FIG. 7. The second pattern may correspond to the pattern of light source locations shown by image regions 72 in FIG. 8.

The first pattern and the second pattern may respectively be compared to the image data 50 to determine for which hypothetical position there results a computed light pattern which matches the detected light in the image data 50 to a higher degree. The vehicle position may thereby be determined with greater accuracy. For illustration, it may be determined that the vehicle 9 is located on a certain lane 75 of plural different lanes 75, 76.

Different techniques may be used to determine which one of plural computed light patterns produces the best match with the image data.

In some implementations, the portion 61 of the image data 50 may be subject to a filtering with a filter mask which depends on the expected light source locations. The filter mask may weight image locations at which light sources are expected more strongly. For illustration, the brightness values in image regions 71 may be summed up or integrated to determine a quantifier for a matching between the expected light pattern with regions 71 and the detected light pattern for one hypothetical vehicle position. The brightness values in image regions 72 may be summed up or integrated to determine a quantifier for a matching between the expected light pattern with regions 72 and the detected light pattern for another hypothetical vehicle position.

In other implementations, other techniques may be used to determine a degree of matching between the detected image data 50 and the light patterns expected for various different vehicle positions. For illustration, a mutual entropy measure may be used. Other similarity measures may be employed.

Additional information stored in the street lighting data may be taken into account when refining the position estimate for the vehicle position. For illustration, the street lighting data may include type data which indicates a direction in which the respective street light emits light. The emission direction indicated by the street lighting data, when available, may be taken into account when computing an expected light pattern. Additionally or alternatively, the street lighting data may include color data indicating an emission color at which the respective street light emits light. The emission color indicated by the street lighting data, when available, may be taken into account when computing the expected light pattern.

Additional information stored in the street lighting data may be taken into account in various ways. For illustration, the type identifier indicative of an emission direction or the color data may be used to enhance the speed with which light sources are detected in the image data 50.

Different techniques may be used to combine the image data and the street lighting data to refine a position estimate, e.g. by detecting a lane on which a vehicle is positioned.

In a navigation system or method according to an embodiment, a portion of the image data located above a horizon line may be identified. The position estimate may be refined by analyzing only the portion of the image data above the horizon line using the street lighting data.

In a navigation system or method according to an embodiment, the processing device may be configured to compute a light pattern above the horizon line based on the street lighting data and to compare the computed light pattern with the portion of the image data located above the horizon line.

In a navigation system or method according to an embodiment, the processing device may be configured to compute the light pattern as a function of a point of view and to vary the point of view to refine the position estimate. The point of view may correspond to or may be determined as a function of vehicle position.

In a navigation system or method according to an embodiment, the processing device may be configured to vary the point of view to increase an image similarity measure of the computed light pattern and the portion of the image data located above the horizon line.

In a navigation system or method according to an embodiment, the processing device may be configured to limit an object recognition procedure to the portion of the image data located above the horizon line to refine the position estimate.

Figure 10:
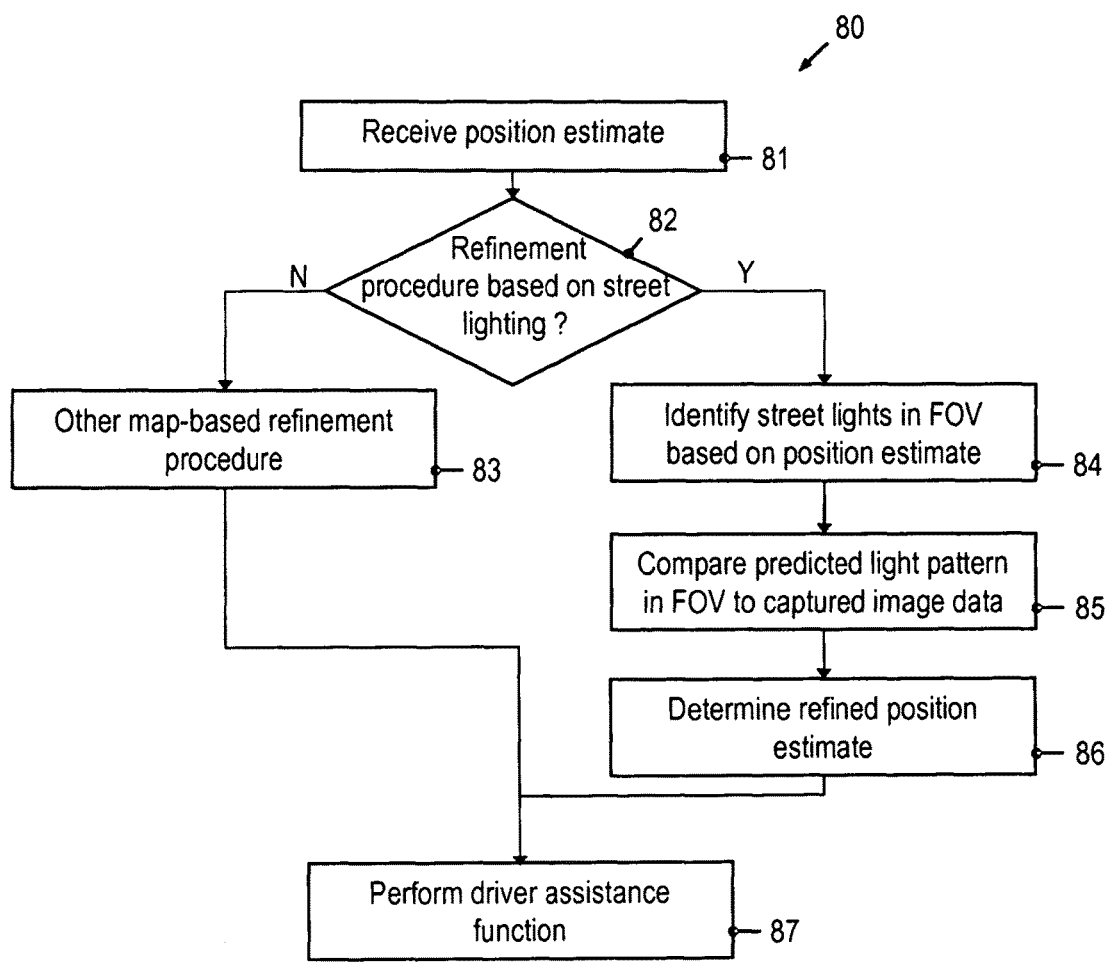
FIG. 10 is a flow chart of a method according to an embodiment.

FIG. 10 is a flow chart of a method 80 according to an embodiment. The method 80 may be performed by the navigation system 1. The various processing steps may be performed by the processing device 2 of the navigation system 1.

At 81, a position estimate is determined. The position estimate may be received from the position sensor 7. The position estimate may be determined based on GPS signals, for example, and/or based on a vehicle sensor which determines a vehicle orientation and/or distance covered by the vehicle.

At 82, it is determined whether the position estimate is to be refined based on street lighting data. The determining at 82 may comprise determining whether the ambient light conditions are such that the street lights may be expected to be turned on. The determining at 82 may comprise determining a time of day to establish whether it is night time. The determining at 82 may comprise processing information which indicates whether the street lights are turned on. Such information may be received via a wireless interface, for example.

At 83, if no refinement of the position estimate based on street lighting data is to be carried out, another procedure may be invoked to determine the vehicle position more accurately. For illustration, during day time, a refinement of a position estimate may be performed using object recognition in combination with map data. Buildings and/or lane markings may be identified in the image data. Matching may be performed between locations of objects expected from the map data as a function of vehicle location and the detected object positions in the image data.

If it is determined at 82 that a more accurate position estimate is to be determined using the street lighting data, the method proceeds to 84.

At 84, it is determined which street lights are located in a field of view of the image sensor. The determining may be performed based on the position data in the street lighting data. The determining may be performed using the position estimate provided by the position sensor.

At 85, a light pattern which is computationally predicted for a vehicle position based on the street lighting data is compared to the image data. The comparison may be limited to a portion of the image data located above the horizon line. The comparison may be performed for several hypothetical vehicle positions. The comparison may be performed for at least two vehicle positions which correspond to the vehicle being positioned on different lanes of a road. A similarity measure between the computationally predicted light pattern and the light pattern shown in the image data may respectively be determined. An iterative procedure may be performed in which a hypothetical vehicle position is gradually altered to identify the position for which the similarity measure between the computationally predicted light pattern and the light pattern shown in the image data reaches a maximum value.

At 86, a refined position estimate may be determined. The refined position estimate may be determined based on the comparison performed at 85. The refined position estimate may be determined such that the comparison between the computationally predicted light pattern and the light pattern shown in the image data fulfils a pre-defined criterion. The pre-defined criterion may be comprise that a similarity measure is at least equal to or greater than a given threshold.

Determining the refined position estimate at 86 may include determining, using the street lighting data, on which one of several road lanes a vehicle is positioned.

At 87, a driver assistance function may be performed.

The driver assistance function may comprise outputting an alert signal when the vehicle is not positioned on the correct lane of a road.

The driver assistance function may comprise outputting an information signal when a lane change is to be performed.

The driver assistance function may include a night vision procedure in which information on the road (e.g. information on lane markings) is highlighted in an optical display or by projecting information onto a driver's field of view. The driver assistance function may comprise identifying lane markings in the FOV of the image sensor 6 using the refined position estimate.

The driver assistance function may include a route guidance operation.

The navigation system and method according to embodiments may use additional information which may be stored in the street lighting data, as will be explained in more detail with reference to FIG. 11 to FIG. 21.

In a navigation system or method according to embodiments, the street lighting data may comprise, for at least some street lights, type data indicating a light pattern shape emitted by the street light.

In a navigation system or method according to embodiments, the type data may respectively be selected from a finite set of indicators.

In a navigation system or method according to embodiments, the type data may be indicative of a shape of a light cone emitted by the street light.

In a navigation system or method according to embodiments, the type data may comprise an indicator which is selected from a group which comprises an indicator for a sphere-shaped light emission pattern, an indicator for a downwardly directed light emission pattern, an indicator for an upwardly directed light emission pattern, and an indicator for a laterally directed light emission pattern.

In a navigation system or method according to an embodiment, the street lighting data may comprise offset data indicating an offset between the light source and a base of the street light.

In a navigation system or method according to an embodiment, the street lighting data may comprise color data indicating a color of the light emitted by the street light. The color data may indicate an RGB color value, for example.

FIG. 11, FIG. 13, FIG. 15 and FIG. 17 illustrate different types of street lights. The different types are distinguished by their light emission patterns and, in particular, by the direction(s) in which light is emitted. FIG. 12, FIG. 14, FIG. 16, and FIG. 18 show exemplary implementations of the associated data for the street light which is stored in the street lighting data. The street lighting data respectively includes position data 12, 13 and height data 14. The street lighting data includes type data 15 indicative of a type of the respective street light. Additional parameters may be stored in the street lighting data for at least some of the types of street lights.

Figure 11:
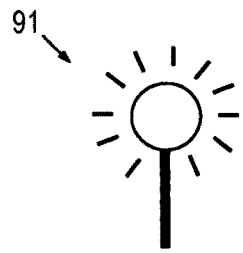
FIG. 11 illustrates a street light of a first type.
Figure 12:
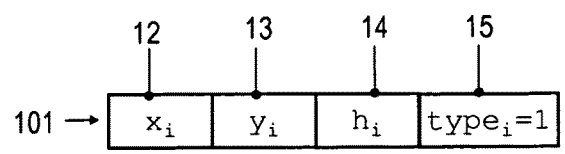
FIG. 12 is a schematic representation of street lighting data for a street light having the first type.

FIG. 11 illustrates a street light 91. The street light 91 may emit light in a spherical light emission pattern. FIG. 12 shows the associated street lighting data 101 for the street light 91. The street lighting data 101 includes type data 15 which indicates, for example, that the street light 101 has a first type. The first type may correspond to a spherical emission pattern.

Figure 13:
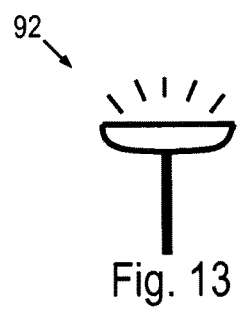
FIG. 13 illustrates a street light of a second type.
Figure 14:
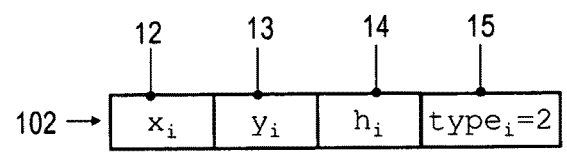
FIG. 14 is a schematic representation of street lighting data for a street light having the second type.

FIG. 13 illustrates a street light 92. The street light 92 may emit light in an upward emission direction. The street light 92 may emit light in an upward light cone. FIG. 14 shows the associated street lighting data 102 for the street light 92. The street lighting data 102 includes type data 15 which indicates, for example, that the street light 102 has a second type. The second type may correspond to a beam cone which is directed upward.

Figure 15:
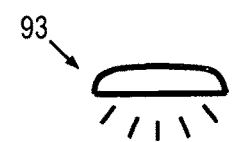
FIG. 15 illustrates a street light of a third type.
Figure 16:
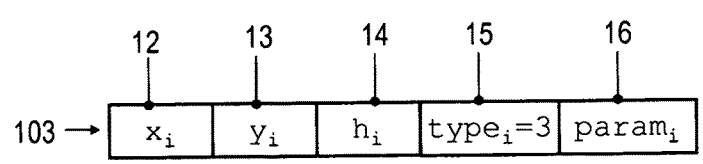
FIG. 16 is a schematic representation of street lighting data for a street light having the third type.

FIG. 15 illustrates a street light 93. The street light 93 may emit light in a downward emission direction. The street light 93 may emit light in a downward light cone. FIG. 16 shows the associated street lighting data 103 for the street light 93. The street lighting data 103 includes type data 15 which indicates, for example, that the street light 103 has a third type. The second type may correspond to a beam cone which is directed downward. The street lighting data 103 may include additional parameters. For illustration, street lights which emit light in a downward beam cone are frequently mounted on a post which has a laterally extending arm, as illustrated in FIG. 5. The parameters stored in the parameter data 16 may specify a length and/or direction of the arm.

Figure 17:
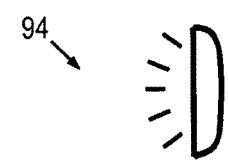
FIG. 17 illustrates a street light of a fourth type.
Figure 18:
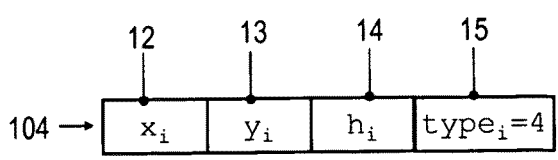
FIG. 18 is a schematic representation of street lighting data for a street light having the fourth type.

FIG. 17 illustrates a street light 94. The street light 94 may emit light in a laterally directed emission direction. The street light 94 may emit light in a laterally directed light cone. FIG. 18 shows the associated street lighting data 104 for the street light 94. The street lighting data 104 includes type data 15 which indicates, for example, that the street light 104 has a fourth type.

While four different types of street lights and the associated street lighting data are illustrated in FIG. 11 to FIG. 18, other numbers of types and/or other types may be used. For illustration, the procedures of refining a position estimate using street lighting data may take into account only certain types of street lights, e.g. only street lights which emit light in a downward beam cone and/or street lights which emit in a spherical emission pattern. The types of street lights which are taken into account may vary depending on the country where the navigation system is used and/or depending on the types of street lights which are predominantly used in certain geographical regions.

The processing device 2 of the navigation system 1 may take the type data 15 into account when matching computationally predicted light patterns to the detected image data. For illustration, the position of a light source in the image data is determined by the hypothetical vehicle position for which the light pattern is computed. The direction in which the light is emitted depends on the type identifier stored in the type data 15. The accuracy of the position determining procedure may be increased further when the light emission direction of the street lights is taken into account.

Figure 19:
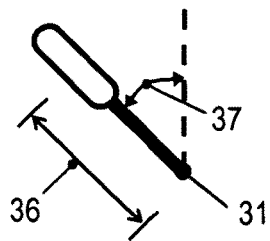
FIG. 19 is a plan view illustrating parameters of a street light which may be included in the street lighting data.

FIG. 19 is a plan view of a street light which emits light in a downward direction. The parameter data 16 may include information indicating the offset 36 between the position 31 indicated by the position data 36 and the (center of the) light source. Additionally or alternatively, the parameter data 16 may include information on a direction in which the light source is offset from the position 31 indicated by the position data 36. The information on the direction may specify an angle 37 between the offset and a coordinate axis or between the offset and a road direction, for example.

While not shown in FIG. 12, FIG. 14, and FIG. 18, a field for parameter data 16 may also be reserved in the street lighting data of the other street light types. While storage space requirements may be increased thereby, a more uniform format of the street lighting data may be realized.

Additional information may be stored in the street lighting data. For illustration, color information indicating a color of the light emitted by the respective street light may be included in the street lighting data for at least some street lights.

Figure 20:
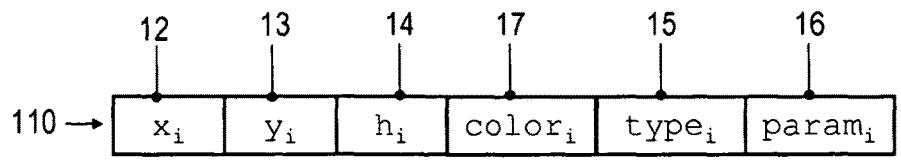
FIG. 20 is a schematic representation of street lighting data for a street light.

FIG. 20 illustrates street lighting data 110. The street lighting data 110 includes color data 17. The color data 17 are indicative of the color of the light emitted by the respective street light. The color data 17 may be included in the street lighting data 110 of only a sub-set of the street lights. The color data 17 may indicate the color as an RGB color, for example, or in another color scheme. The color data 17 may also be an indicator which discriminates between different discrete colors only, e.g. white light and yellow light.

The street lighting data may have various formats. For illustration, it is not required that the height data, parameter data and/or color data is stored individually for each street light. In many countries, the heights at which light sources of a certain type of street light are mounted are standardized to some degree. The type data may then be indicative not only of the light emission pattern, but may also indicate the height at which the light source is installed above ground.

Figure 21:
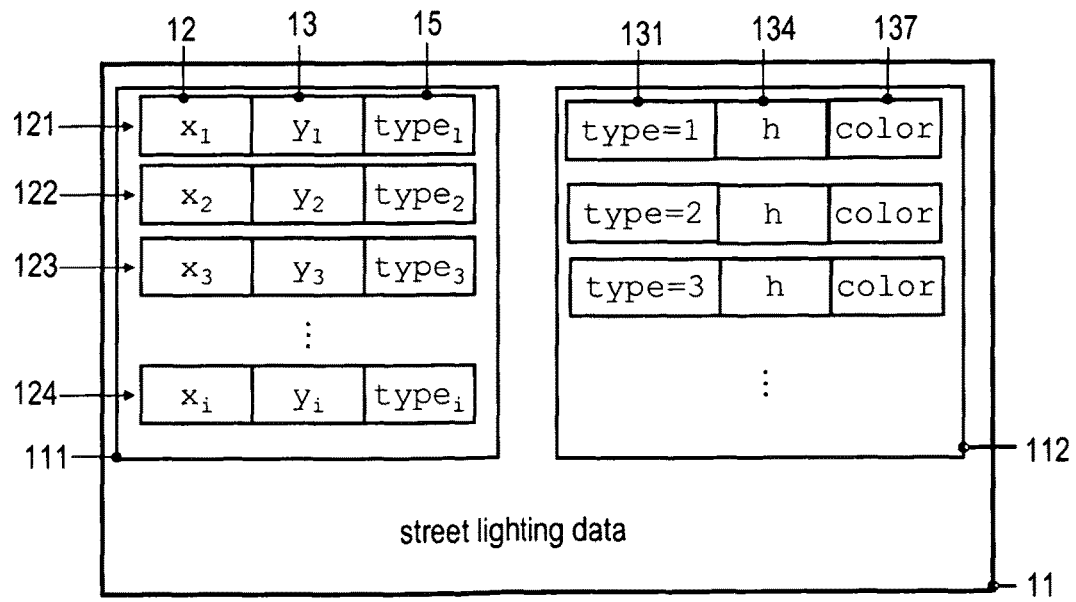
FIG. 21 is a schematic representation of street lighting data of a navigation system according to an embodiment

FIG. 21 shows an implementation of street lighting data 110 of a navigation system according to embodiments. The street lighting data 110 include first data 111. The first data 111 may be a first table. The first data 111 may be a first table of a relational database. The first data 111 may include information on the positions and types of street lights.

The street lighting data 110 includes second data 112. The second data may be a second table. The second data 112 may be a second table of a relational database. The second data 112 may include height data 134 on the height of a light source above ground, respectively for different street light types. The second data 112 may additionally or alternatively include color data 137 indicating the color of the emitted light, respectively for different street light types. This information may be stored as a function of street light type as indicated by type identifier 131

A wide variety of other implementations of the street lighting data may be used in embodiments. For illustration, separate tables may be used for street lights of different types. The street lighting data may comprise a first table which includes information on the positions of street lights having a first type. The first table may also include height data indicating the heights of the light sources of the first type above ground. The street lighting data may comprise a second table which includes information on the positions of street lights having a second type. The second table may also include height data indicating the heights of the light sources of the second type above ground.

The street lighting data may be permanently stored in the navigation system 1. In other implementations, at least a part of the street lighting data may be retrieved over a wireless interface. The part of the street lighting data may be retrieved over the wireless interface on demand when required for an advanced driver assistance function. Certain lighting conditions, e.g. low ambient light, or other conditions, e.g. a time of day which corresponds to night time, may trigger retrieval of street lighting data over a wireless interface.

A database which includes the street lighting data may be generated in various ways. In some embodiments, a stream of images may be captured by a vehicle which travels through urban areas during night time. The vehicle position may also be recorded. The images may be automatically analyzed to determine positions of street lights, types of street lights, and the heights of light sources above the ground. Other parameters may also be automatically detected by object recognition. For illustration, the light emission color and/or the offset between the center of the light source and the base of the street light may be automatically detected.

Additionally or alternatively, the creation of map data by a user community is getting increasingly popular. In such community-based projects, users contribute images and/or other information on streets, points of interest, but also on street lights. The information contributed by users may include data input and/or images. From this information, the positions of street lights, types of street lights, heights of the light sources, and other parameters may be extracted. The street lighting data may be assembled from the data contributed by many users.

While navigation systems and methods according to embodiments have been described in detail, modifications may be implemented in other embodiments. For illustration, while embodiments were described in which image data and street lighting data of a map database are processed to determine a lane on which a vehicle is positioned, the techniques may additionally or alternatively also be used to improve the accuracy with which the vehicle position along a longitudinal direction of a road is determined. The refinement of the position estimate may additionally or alternatively comprise determining a vehicle orientation with higher accuracy.

For further illustration, while embodiments have been described in which street lighting data is used for refining a position estimate, the navigation system and method according to embodiments may be configured to perform other procedures for position determination. For illustration, during day time or in good ambient light conditions, a position refinement may be performed by detecting lane markings and/or by matching buildings detected in an image with map data.

Embodiments of the invention may be used for vehicle navigation systems. The navigation system may be a vehicle navigation system which is fixedly installed in a vehicle, e.g. in a car, or a mobile navigation system.

The invention claimed is:

1. A navigation system, comprising:
an image sensor configured to capture image data;
a map database comprising street lighting data that includes, for a plurality of street lights, position data indicating a position at which a street light is installed and height data indicating a height at which a light source of the street light is located; and
a processing device coupled to the map database and the image sensor, the processing device configured to:
identify a portion of the image data located above a horizon line;
refine a position estimate by analyzing the portion of the image data in view of the street lighting data;
compute a light pattern above the horizon line based on the street lighting data; and
compare the computed light pattern with the portion of the image data located above the horizon line,
wherein computing the light pattern comprises computing the light pattern as a function of a point of view and varying the point of view based on a comparison of the computed light pattern and the portion of the image data located above the horizon line to refine the position estimate.

2. The navigation system of claim 1, wherein the processing device is configured to vary the point of view to increase an image similarity measure of the computed light pattern and the portion of the image data located above the horizon line.

3. The navigation system of claim 1, wherein the processing device is configured to limit an object recognition procedure to the portion of the image data located above the horizon line to refine the position estimate.

4. The navigation system of claim 1, wherein the street lighting data comprises type data indicating a light pattern shape emitted by the street light.

5. The navigation system of claim 4, wherein the type data comprises an indicator that is selected from a group comprising an indicator for a sphere-shaped light emission pattern, an indicator for a downwardly directed light emission pattern, an indicator for an upwardly directed light emission pattern, and an indicator for a laterally directed light emission pattern.

6. The navigation system of claim 1, wherein the street lighting data comprises, for at least a sub-set of the plurality of street lights, offset data indicating an offset between the light source and a base of the street light.

7. The navigation system of claim 1, further comprising a position sensor configured to determine the position estimate, wherein the processing device is coupled to the position sensor and configured to refine the position estimate based on the image data and a portion of the street lighting data that is selected based on the position estimate.

8. The navigation system of claim 1, wherein the processing device is configured to control a driver assistance function as a function of the refined position estimate.

9. The navigation system of claim 8, wherein the processing device is configured to determine on which lane of a road a vehicle is located by analyzing the image data in view of the street lighting data and to control the driver assistance function as a function of the determined lane.

10. A vehicle, comprising:
a navigation system that includes:
an image sensor configured to capture image data,
a map database comprising street lighting data that includes, for a plurality of street lights, position data indicating a position at which a street light is installed and height data indicating a height at which a light source of the street light is located, and
a processing device coupled to the map database and the image sensor, the processing device configured to:
identify a portion of the image data located above a horizon line;
refine a position estimate by analyzing the portion of the image data in view of the street lighting data;
compute a light pattern above the horizon line based on the street lighting data; and
compare the computed light pattern with the portion of the image data located above the horizon line,
wherein computing the light pattern comprises computing the light pattern as a function of a point of view and varying the point of view based on a comparison of the computed light pattern and the portion of the image data located above the horizon line to refine the position estimate.

11. A method of determining a vehicle position, comprising:
capturing image data via an image sensor installed in a vehicle;
retrieving street lighting data from a map database, wherein the street lighting data includes, for a plurality of street lights, position data indicating a position at which a street light is installed, and height data indicating a height at which a light source of the street light is located;
identifying a portion of the image data located above a horizon line;
refining a position estimate by analyzing the portion of the image data in view of the street lighting data;
computing a light pattern above the horizon line based on the street lighting data; and
compare the computed light pattern with the portion of the image data located above the horizon line, wherein computing the light pattern comprises computing the light pattern as a function of a point of view and varying the point of view based on a comparison of the computed light pattern and the portion of the image data located above the horizon line to refine the position estimate.

12. The method of claim 11, wherein varying the point of view comprises increasing an image similarity measure of the computed light pattern and the portion of the image data located above the horizon line.

13. The method of claim 11, wherein the street lighting data includes type data indicating a light pattern shape emitted by the street light.

14. The method of claim 13, wherein the type data includes an indicator selected from a group comprising an indicator for a sphere-shaped light emission pattern, an indicator for a downwardly directed light emission pattern, an indicator for an upwardly directed light emission pattern, and an indicator for a laterally directed light emission pattern.

* * * * *